(12) United States Patent
Ofek et al.

(10) Patent No.: US 8,266,132 B2
(45) Date of Patent: Sep. 11, 2012

(54) MAP AGGREGATION

(75) Inventors: Eyal Ofek, Redmond, WA (US); Boris Epshtein, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 12/396,496

(22) Filed: Mar. 3, 2009

(65) Prior Publication Data

US 2010/0225665 A1 Sep. 9, 2010

(51) Int. Cl.
*G06F 7/00* (2006.01)
(52) U.S. Cl. .......................... 707/706; 707/709; 345/629
(58) Field of Classification Search ................. 707/706, 707/709; 345/629
See application file for complete search history.

(56) References Cited

U.S. PATENT DOCUMENTS

| 5,546,107 | A | 8/1996 | Deretsky et al. | |
|---|---|---|---|---|
| 7,451,041 | B2 | 11/2008 | Laumeyer et al. | |
| 2006/0041375 | A1* | 2/2006 | Witmer et al. | 701/208 |
| 2006/0271281 | A1* | 11/2006 | Ahn et al. | 701/208 |
| 2007/0115373 | A1* | 5/2007 | Gallagher et al. | 348/231.3 |
| 2007/0188516 | A1 | 8/2007 | Ioup et al. | |
| 2008/0059452 | A1* | 3/2008 | Frank | 707/5 |
| 2008/0192053 | A1 | 8/2008 | Howell et al. | |
| 2008/0268876 | A1* | 10/2008 | Gelfand et al. | 455/457 |

OTHER PUBLICATIONS

"Geographic location tags on Digital Images", Toyama et al. Copyright 2003 ACM.*

Michelson, et al., "Identifying Maps on the World Wide Web", Proceedings of the 5th international conference on Geographic Information Science, retrieved at <<http://www.isi.edu/~michelso/paps/gisci08.pdf>>, Sep. 23-26, 2008, pp. 249-260.
"Detection and Extraction of Text Connected to Graphics in Maps", retrieved at <<http://www.comp.nus.edu.sg/~tancl/Papers/caorn/icdar01_cao.pdf>>, pp. 13.
Chiang, et al., "Automatic Extraction of Road Intersections from Raster Maps", 13th ACM International Symposium on Advances in Geographic Information Systems (ACM-GIS'05), 2005, retrieved at <<http://www.isi.edu/integration/papers/chiang05-acmgis.pdf>>, Nov. 4-5, 2005, pp. 10.
Chen, et al., "Automatically Conflating Road Vector Data with Orthoimagery", GeoInformatica, retrieved at <<http:// www.isi.edu/integration/papers/chen06-geoinformatica.pdf>>, vol. 10, No. 04, Dec. 2006, pp. 495-530.
Desai, "Automatically Identifying and Georeferencing Street Maps on the Web", Proceedings of the 2005 Workshop on Geographic Information Retrieval, GIR 2005, retrieved at http://www.isi.edu/integration/papers/sneha05-gir.pdf>>, Nov. 4, 2005, pp. 35-38.
Lowe, David. G., "Distinctive Image Features from Scale-Invariant Keypoints", International Journal of Computer Vision, 2004, retrieved at <<http://www.cs.ubc.ca/~lowe/papers/ijcv04.pdf>>, Jan. 5, 2004, pp. 1-28.

(Continued)

*Primary Examiner* — Etienne Leroux
*Assistant Examiner* — Cindy Nguyen

(57) ABSTRACT

A system described herein includes a text extractor component that extracts text from a digital image and a determiner component that automatically determines whether or not the digital image is a map of a geographic region based at least in part upon the extracted text. The system additionally includes a correlator component that generates correlation data that causes the digital image to be correlated with a portion of a reference map that pertains to the geographic region if the determiner component determines that the digital image is a map of the geographic region.

20 Claims, 10 Drawing Sheets

OTHER PUBLICATIONS

Chawathe, Sudarshan. S., "Segment-Based Map Matching", Proceedings of the 2007 IEEE Intelligent Vehicles Symposium, 2007, retrieved at <<http://ieeexplore.ieee.org/stamp/stamp.jsp?arnumber=04290280>>, Jun. 13-15, 2007, pp. 1190-1197.

Kang, Hoseok., "Spatial Data Integration: A Case Study of Map Conflation with Census Bureau and Local Government Data", University Consortium for Geographic Information Science (UCGIS) Summer Assembly, 2001, retrieved at <<http://www.cobblestoneconcepts.com/ucgis2summer/kang/kang_main.htm>>, Jun. 2001, pp. 6.

* cited by examiner

MAP AGGREGATION

BACKGROUND

Various types of mapping applications can be accessed by way of the Internet, for example, through use of a browser. For instance, a user can access a mapping application by typing a Uniform Resource Locator (URL) into a particular field of the browser. Once the user is provided with the mapping application, the user can provide such mapping application with search terms pertaining to a particular geographic region. Thus, the user may provide a name of a state or province, the name of a city, the name of a street, a street address, a particular restaurant name, a zip code, some combination of a state, city and street, etc. The mapping application may then provide the user with a map pertaining to the geographic region corresponding to the search query entered by the user.

Typically, maps presented to users by way of a mapping application are limited to a conventional street map (a map that displays streets of a region to a user), an aerial map of the geographic region, and/or in some instances, a street level map which can provide a user with a three-dimensional representation of a region from a certain viewing perspective. While these maps can provide useful information to a user, they are typically limited to data pertaining to streets and other points of interest such as parks, restaurants, monuments, etc.

Various other types of map images are also available by way of the Internet. For instance, a county auditor website may provide access to a tax map of a particular geographic region. Other maps that may be available by way of the Internet can include maps of hike trails, ski resorts, location of businesses, maps of underground structures, maps of public transportation, amongst others. These maps may be difficult or cumbersome for a user to locate, and it may be difficult to correlate locations pertaining to these maps to a reference coordinate system.

SUMMARY

The following is a brief summary of subject matter that is described in greater detail herein. This summary is not intended to be limiting as to the scope of the claims.

Various technologies pertaining to locating and aggregating images that are determined to be maps of certain geographic regions in a reference coordinate system are described herein. Digital images can be automatically located, and a determination can be made regarding whether or not the digital images are maps of particular geographic regions of the earth. For instance, a web crawler can be employed to locate digital images that are available by way of the Internet (e.g., are available on the World Wide Web). Once it is determined that a digital image is a map of a geographic region, the digital image can be correlated with a reference map. For example, the reference map may be accessible by way of a mapping application and the correlation can be undertaken such that when a user enters a search for the geographic region, an indication is provided to the user that the digital image is a map that pertains to the geographic region.

A plurality of mechanisms can be utilized in connection with determining whether a digital image is a map of a geographic region. In an example, text can be extracted from the digital image and compared with a database of known points of interest. These known points of interest may be names of states, cities, streets, restaurants, parks, resorts or other businesses, etc. If a sufficient match exists between text extracted from the digital image and points of interest that correspond to a particular geographic region, it can be determined that the digital image is a map of the geographic region.

In another example, a geospatial comparison can be made between points of interest and a digital image (e.g., points of interest determined by way of text extraction) and known points of interest on a reference map. For instance, a Voronoi diagram can be drawn on the reference map, and the points of interest located in the digital image can be projected onto the reference map. If the digital image can be transformed (e.g., coordinate system modified, oriented, . . . ) such that a threshold number of points of interest on the digital image translate to a corresponding Voronoi cell in the Voronoi diagram drawn on the reference map, then it can be determined that the digital image is a map of the geographic region. In still yet another example, located points of interest in the digital image can be translated to the reference map, and if a sufficient match exists between the located points of interest in the digital image and points of interest in the reference map within a threshold allowable radius of error, then it can be determined that the digital image is a map of the geographic region.

Other aspects will be appreciated upon reading and understanding the attached figures and description.

DETAILED DESCRIPTION

Figure 1:
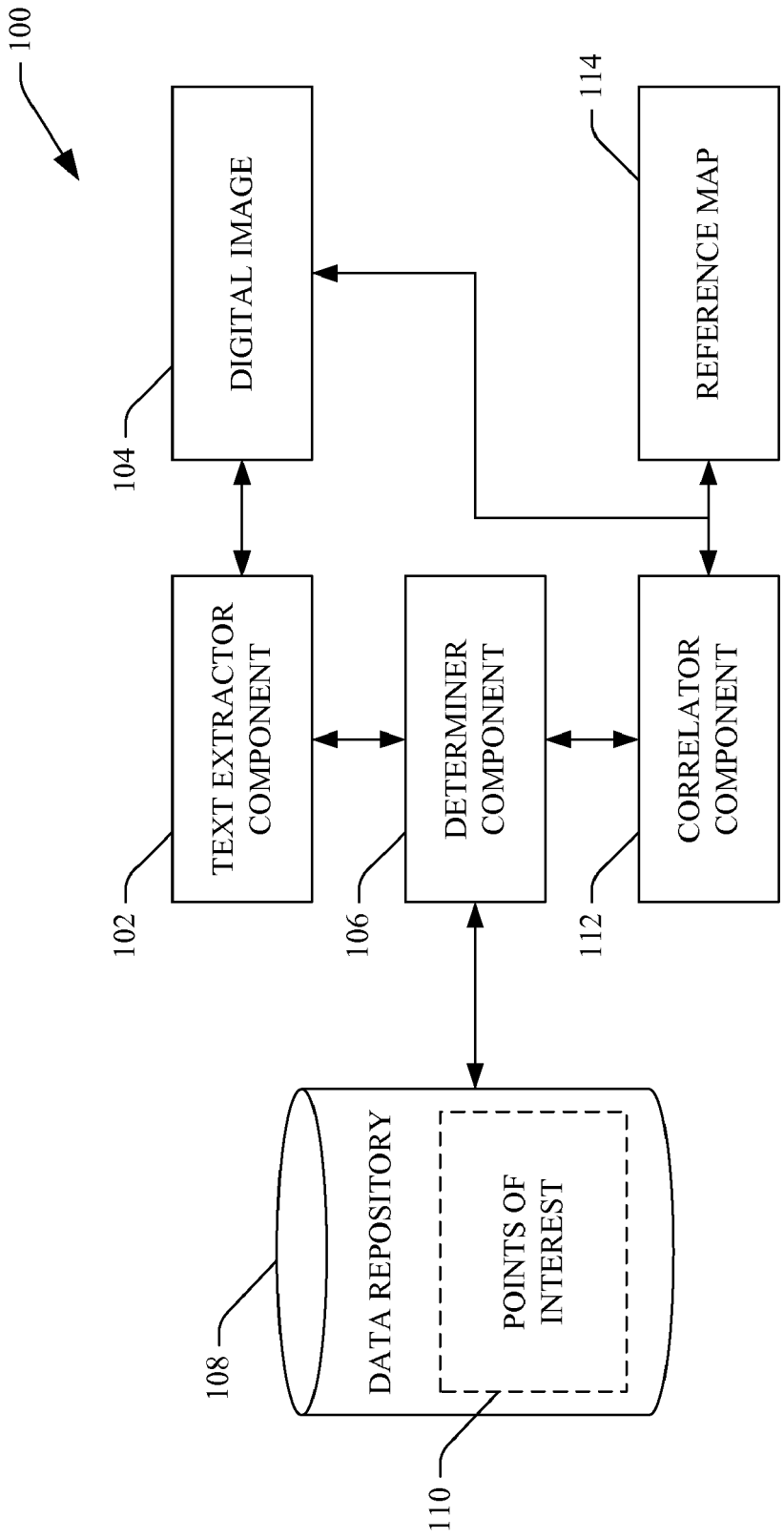
FIG. 1 is a functional block diagram of an example system that facilitates determining that a digital image is a map of a geographic region.

Various technologies pertaining to determining whether a digital image is a map of a particular geographic region will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates determining whether a digital image is a map of a geographic region is illustrated. The system 100 may reside on a server, wherein the server can provide a mapping application that can be accessed by way of the Internet. In another example, the system 100 may reside on a client device or may be distributed between a server and a client. The system 100 includes a text extractor component 102 that can extract text from a digital image 104. The digital image 104 may have any suitable image format such as bitmap, .tiff, .jpg or other suitable format. For instance, text in an image may be indicative that the digital image 104 is a map, as the vast majority of maps include names of geographic entities such as cities, rivers, mountains, etc.

The text extractor component 102 can use any suitable technique in connection with extracting text from the digital image 104. For instance, the text extractor component 102 can detect a layer of text in the digital image 104 and separate such text from the digital image 104. Specifically, text and digital images are often of a constant font and color, and such information can be used to detect a layer of text in the digital image 104. The text extractor component 102 can also use, for instance, optical character recognition in connection with recognizing words, letters, numbers or symbols in the digital image 104.

The system 100 can also include a determiner component 106 that can automatically determine whether or not the digital image 104 is a map of a geographic region based at least in part upon text extracted from the digital image 104 by the text extractor component 102. In an example, the system 100 may include a data repository 108 that comprises known points of interest 110, wherein the points of interest 110 can include names of countries, states or provinces, cities, streets, parks, landmarks, monuments, restaurants and/or other known points of interest. Further, each point of interest in the points of interest 110 can have geospatial data that corresponds thereto. Pursuant to an example, each point of interest in the points of interest 110 may correspond to a latitude/longitude point or a range of latitude/longitude points. In another example, a first point of interest in the points of interest 110 can correspond to a second point of interest in the points of interest 110. Thus a certain street may correspond to a particular city. Similarly, the particular city may correspond with a certain state or province.

The determiner component 106 can compare the text extracted by the text extractor component 102 with the points of interest 110 in the data repository 108. If there is a sufficient match between the text extracted by the text extractor component 102 and points of interest in the points of interest 110 that correspond to a certain geographic region, the determiner component 106 can ascertain that it is likely that the digital image 104 is a map of the certain geographic region.

The determiner component 106 can use any of a plurality of mechanisms or rules when comparing text extracted from the digital image 104 by the text extractor component 102 with the points of interest 110 in the data repository 108. For instance, to account for possible errors that may occur during text extraction, the determiner component 106 can output a match between a word in the extracted text and a word in a point of interest if a certain number of letters of such words match and/or a certain percentage of such words match. Similarly, the determiner component 106 can indicate that the digital image 104 is a map of a geographic region if there are a threshold number of matches between extracted words or phrases and points of interest that correspond to a particular geospatial range. In still yet another example, the determiner component 106 can indicate that the digital image 104 is a map of the geographic region if a certain percentage of letters, words, phrases, symbols, etc. is found to match points of interest in the points of interest 110 within a threshold geospatial range.

As will be described in greater detail herein, the determiner component 106 can also perform a geospatial comparison between text found in the digital image 104 and matching points of interest in a reference map. For instance, the digital image 104 can be back projected onto a reference map, and the determiner component 106 can estimate the quality of the match using any suitable geospatial comparison technique. Based at least in part upon the geospatial comparison and/or matches between extracted text and known points of interest, the determiner component 106 can determine that the digital image 104 is a map of a certain geographic region.

The system 100 may further include a correlator component 112 that can generate correlation data that causes the digital image 104 to be correlated with a portion of a reference map 114 that pertains to the geographic region if the determiner component 106 determines that the digital image 104 is a map of the geographic region. Correlation data generated by the correlator component 112 may include pointers that cause at least a portion of the reference map 114 (e.g., a certain city) to correspond to the digital image 104. Thus, if the user were to search for the geographic region, such user could be provided with a portion of the reference map 114 that pertains to the geographic region as well as an indication that the digital image 104 is also a map of the geographic region. Such indication may be a selectable link that can cause the digital image 104 to be provided to a user. In another example, the indication may be a simultaneous display of the digital image 104 with the reference map 114. The system 100 can be configured to perform correlations for a multitude of digital images determined to be maps of geographic regions, and thus can be used in connection with aggregating a plurality of maps in a mapping application.

Figure 2:
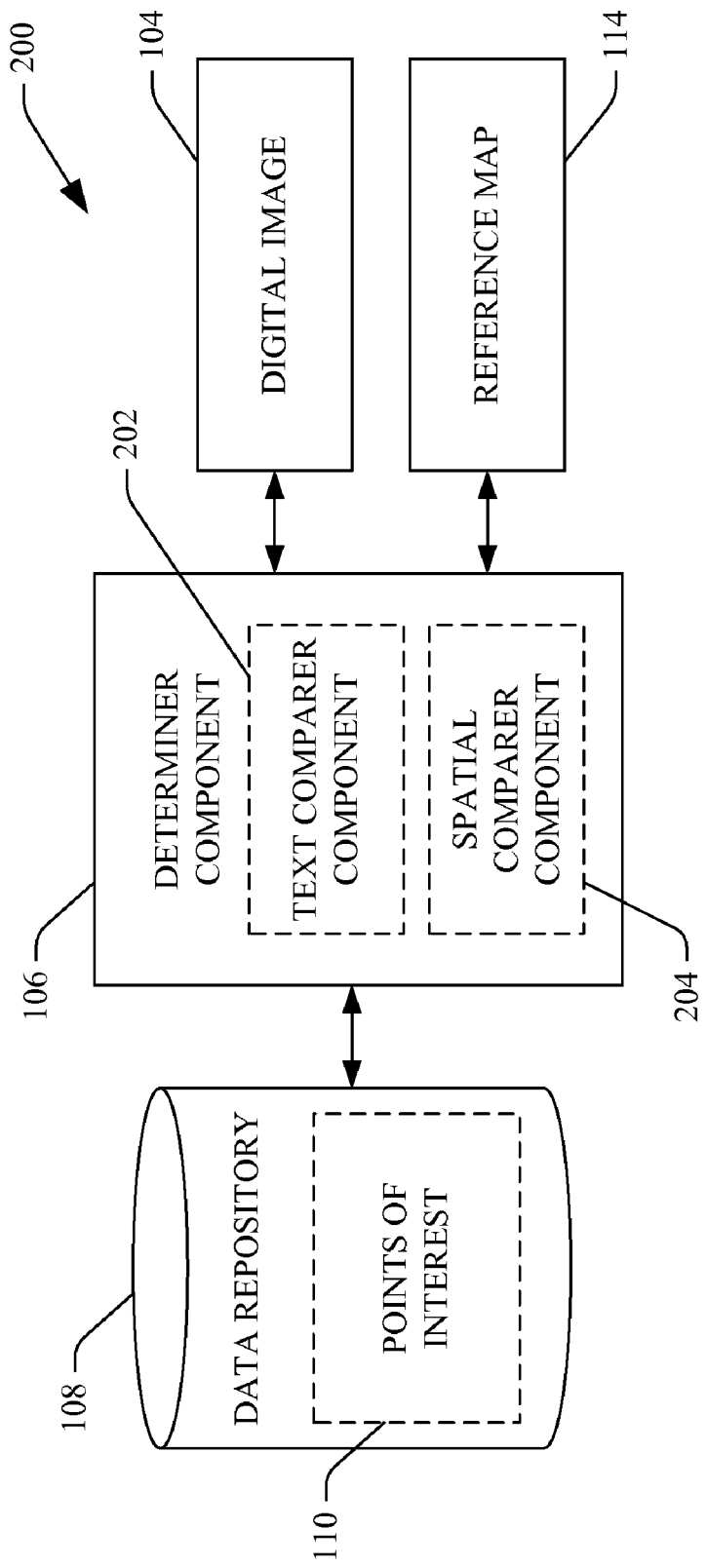
FIG. 2 is a functional block diagram of an example system that facilitates determining whether or not a digital image is a map of a geographic region.

Referring now to FIG. 2, an example system 200 that facilitates determining whether a digital image is a map of a geographic region is illustrated. The system 200 includes the determiner component 106, which receives text extracted from the digital image 104 and compares such extracted text with known points of interest 110 in the data repository 108. The determiner component 106 can include a text comparer component 202 which can receive text extracted from the digital image 104 and compare such text with the points of interest 110 in the data repository 108. The extracted text may include letters, numbers, symbols, words, phrases and/or the like. The text comparer component 202 can determine if there is a sufficient match between extracted text from the digital image 104 and points of interest in the points of interest 110. Also, the text comparer component 202 can ensure that there is some geographic correlation between points of interest that match extracted text.

The determiner component 106 may further include a spatial comparer component 204 that can perform a spatial comparison between points of interest in the digital image 104 and matching points of interest on the reference map 114. For example, the digital image 104 may be a map that has a coordinate system and orientation that is different from the reference map 114. The spatial comparer component 204 can attempt to perform a transformation on the digital image 104 such that points of interest in the digital image 104 (e.g., as evidenced by text in the digital image 104) correspond to the points of interest on the reference map 114 (e.g., points of interest that match the extracted text placed in the appropriate position on the reference map 114). If a valid transformation is performed such that a sufficient spatial correlation exists between points of interest in the digital image 104 and points of interest in the reference map 114, the determiner component 106 can indicate that the digital image 104 is a map of a certain geographic region included in the reference map 114.

The spatial comparer component 204 can use any suitable transformation technique in connection with determining that a valid transformation exists between the digital image 104 and at least a portion of the reference map 114. For instance, the spatial comparer component 204 can use a simple two-dimensional rigid transformation (e.g., two-dimensional positioning, rotation and scaling). In another example, the spatial comparer component 204 can utilize an affine transformation, a projective transformation using known math projections, etc. in connection with estimating a transformation between the digital image 104 and at least a portion of the reference map 114. Furthermore, the spatial comparer component 204 can use a technique that is robust under positional noise. For instance, there is no standard for position of text with respect to a point of interest on a map—text may appear in the vicinity of a point of interest in any suitable direction in the digital image 104, for example. Furthermore, a position of interest may have no exact location. For instance, the position of a state park may be marked in the digital image 104 at a center of the park or any other point in the park. Thus, again the spatial comparer component 204 can use a technique that is robust in view of positional noise.

In one example, the spatial comparer component 204 can use a Voronoi diagram on the reference map 114 in connection with determining an approximate transformation of points of interest in the digital image 104. A point of interest in the digital image 104 can be determined by position of text in the digital image 104 and can desirably be transformed to a Voronoi cell that corresponds to a matching point of interest in the reference map 114. In another example, the spatial comparer component 204 can determine that a transformation of the digital image 104 to a portion of the reference map is valid if every transformed point of interest in the digital image 104 falls inside a radius of error around a corresponding point of interest in the reference map 114. Furthermore, the spatial comparer component 204 can consider different positional accuracies for differing points of interest. For instance, a name of a city or other point of interest may be deemed a suitable match to a known point of interest if it falls within a relatively small radius of error, while other less accurate points of interest may be deemed a suitable match to a known point of interest if it falls within a relatively large radius of error. Linear features, like street names or river names, may have directional uncertainty—therefore, they may have a relatively small radius of error in a direction orthogonal to the feature and a relatively large radius of error in a direction along the feature.

As noted above, the digital image 104 may be a map that has a coordinate system that is different from the coordinate system used in the reference map 114. Furthermore, orientation of the digital image 104 may be nonidentical to orientation of the reference map 114. The spatial comparer component 204 can use any suitable technique in connection with modifying the coordinate system and/or orientation of the digital image 104 to more closely match that of the reference map 114. For instance, the spatial comparer component 204 can orient the digital image 104 and modify the coordinate system of the digital image 104 such that three or more points of interest in the digital image 104 align with corresponding points of interest in the reference map 114. After such alignment has taken place, other points of interest in the digital image 104 can be compared with corresponding points of interest in the reference map 114 by way of any suitable transformation technique.

Thus, the spatial comparer component 204 can generate a "rough" transformation found in the text-matching stage undertaken by the text comparer component 202, which can limit a possible number of valid transformations (as text matches can be required to be geographically corresponding to one another).

The spatial comparer component 204 can further transform the digital image 104 to correspond to the reference map 114 using more granular techniques once it is determined that the digital image 104 is a map of the geographic region. For instance, the spatial comparer component 204 can locate certain linear features in the digital image 104 such as roads, intersections, rivers, boundaries, etc. The spatial comparer component 204 can then locate corresponding linear features in the reference map 114 and can transform/modify the digital image 104 based at least in part upon the corresponding linear features in the digital image 104 and the reference map 114.

Figure 3:
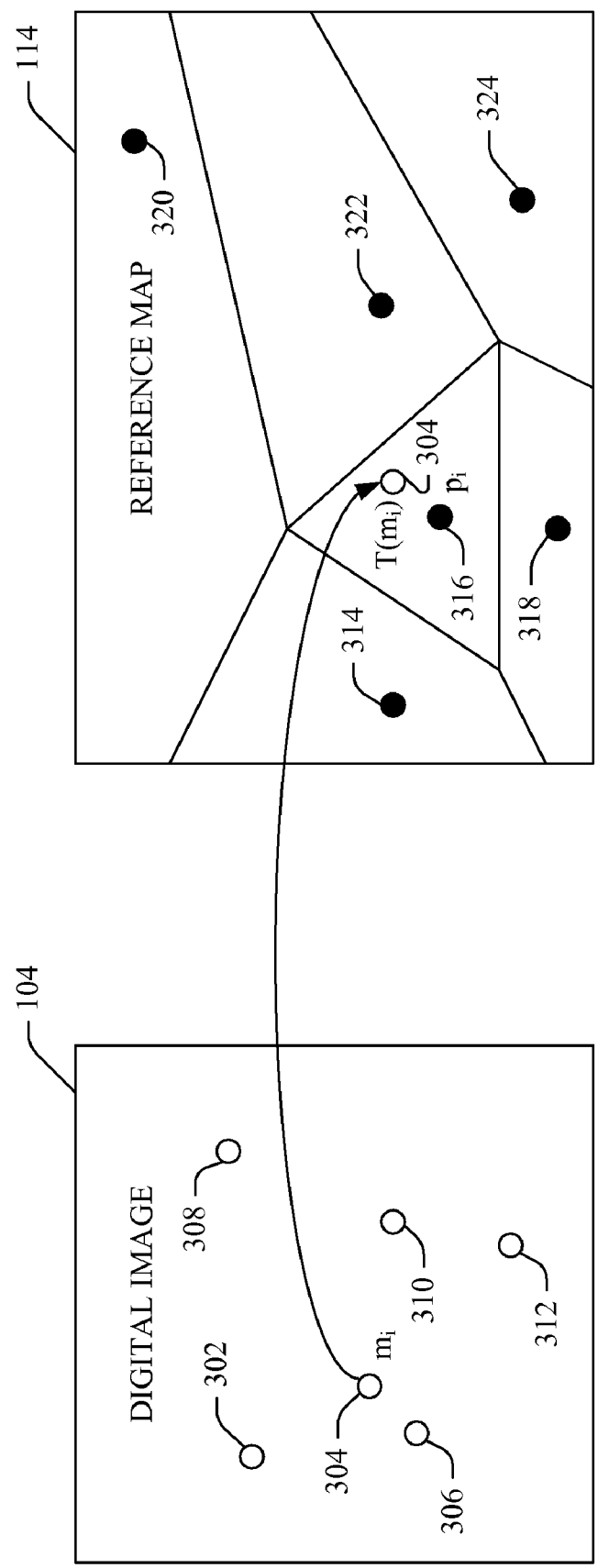
FIG. 3 is an example depiction of a geospatial transformation between a digital image of and reference map.

Referring now to FIG. 3, an example transformation that can be undertaken by the spatial comparer component 204 (FIG. 2) between the digital image 104 and the reference map 114 is illustrated. The digital image 104 is shown to include a plurality of points of interest 302 to 312, wherein the location of the points of interest in the digital image 104 may be approximate location of text in the digital image 104. The reference map 114 may include points of interest 314 through 324 which correspond to the points of interest 302 to 312 in the digital image 104. For instance, the text comparer component 202 (FIG. 2) may have ascertained that the points of interest 314 through 324 sufficiently match the points of interest 302 through 312 in the digital image 104.

As shown, a Voronoi diagram has been drawn on the reference map 114. Accordingly, each point of interest 314 to 324 is included in a Voronoi cell, and any point in a cell is closer to the point of interest in such cell than any other point of interest.

The spatial comparer component 204 can perform a transformation on the digital image 104 to determine if the points of interest 302 to 312 fall in Voronoi cells of the corresponding points of interest 314 to 324 in the reference map. For instance, $M_i$ i=1 . . . n can be a set of points of interest in the digital image 104, and $P_i$ i=1 . . . n can be the corresponding points of interest in the reference map 114 (e.g., as ascertained by the text comparer component 202). A valid approximate transformation of the digital image 104 can be defined as a transformation wherein for each point of interest $M_i$ to coordinate systems of the reference map $T(M_i)$, the corresponding $P_i$ will be the closest point of interest in the reference map 114 to $T(M_i)$. That is, in the Voronoi diagram in the reference map 114, $T(M_i)$ will fall within the Voronoi cell of $P_i$. As noted above, use of a Voronoi diagram is but one exemplary mechanism for performing an estimated transformation of the digital image 104. In another example, a threshold radius of error can be placed around each $P_i$ in the reference map 114. The spatial comparator component 204 may then attempt to transform the digital image 104 such that each $M_i$ falls within the radius of error of the corresponding $P_i$ in the reference map 114.

Figure 4:
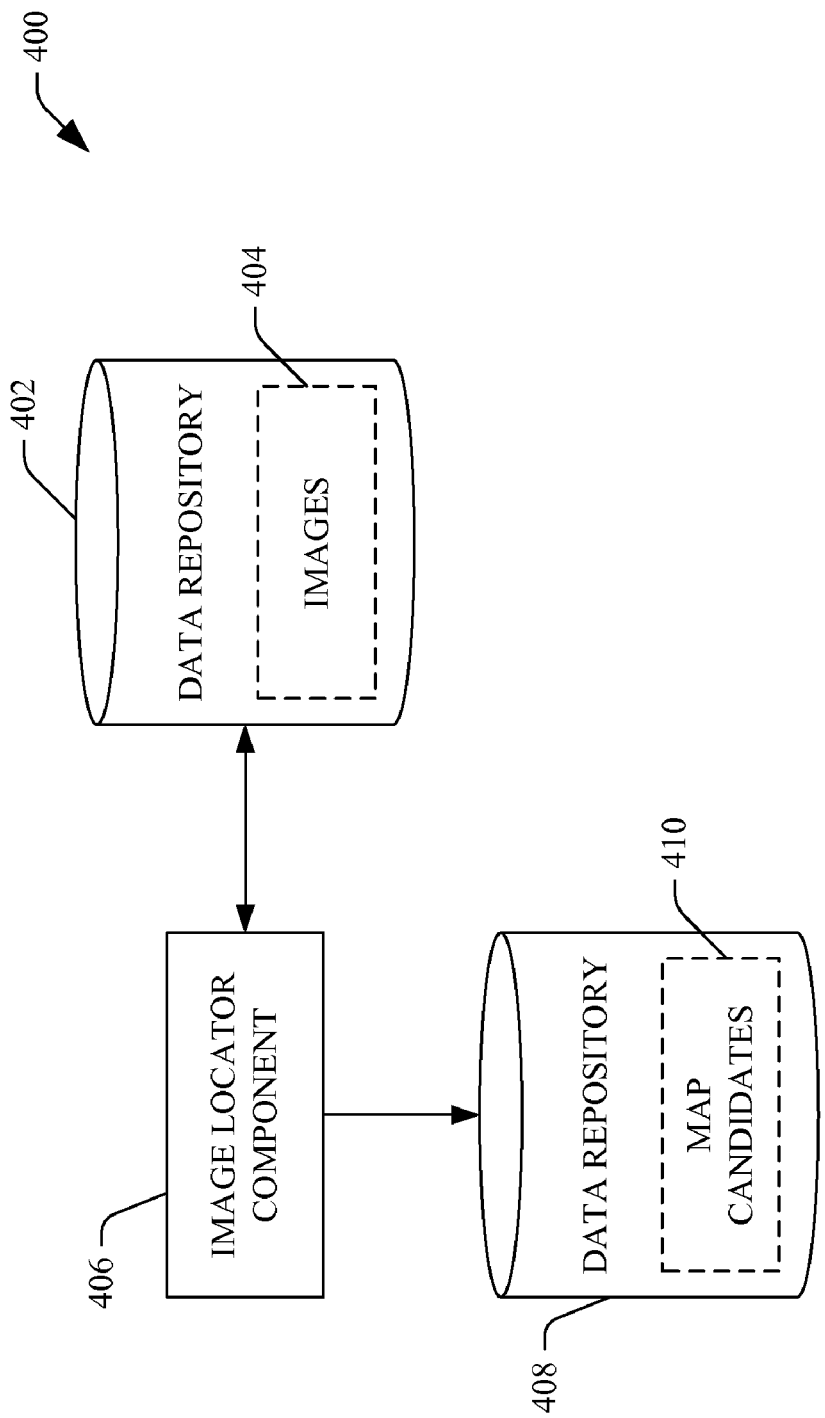
FIG. 4 is a functional block diagram of an example system that facilitates locating images that are candidates to be a map of a geographic region.

Referring now to FIG. 4, an example system 400 that facilitates locating images that are candidates to be maps of the earth is illustrated. The system 400 includes a first data repository 402 that comprises a plurality of images 404. These images may be in any suitable image format and may have metadata associated therewith. Furthermore, the data repository 402 may be accessible by way of the Internet. In another example, the data repository 402 may represent contents of the World Wide Web. The images 404 in the data repository 402 may be any suitable type of image including a map, building layouts, pictures of landscapes, etc.

The system 400 additionally includes an image locator component 406 that can search the data repository 402 for the images 404 therein. For instance, the image locator component 406 can be a web crawler that is configured to retrieve images in the World Wide Web. The image locator component 406 can additionally analyze retrieved images to determine if such images are candidates to be a map. For instance, the image locator component 406 can analyze metadata corresponding to retrieved images and search for terms such as map, regions, etc. in the metadata. In another example, each image retrieved by the image locator component 406 can be treated as a candidate to be a map. In still yet another example, the image locator component 406 can perform text extraction on retrieved images and can determine whether an image is a candidate to be a map based at least in part upon extracted text.

The system 400 can also include a second data repository 408 that stores images retrieved by the image locator component 406 that are found to be candidates to be a map of a geographic region of the earth. Such images are shown in FIG. 4 as being map candidates 410 and are stored in the second data repository 408. These map candidates 410 may then be subject to text extraction by the text extractor component 102 and a determination of whether a map candidate is a map of a particular geographic region.

Figure 5:
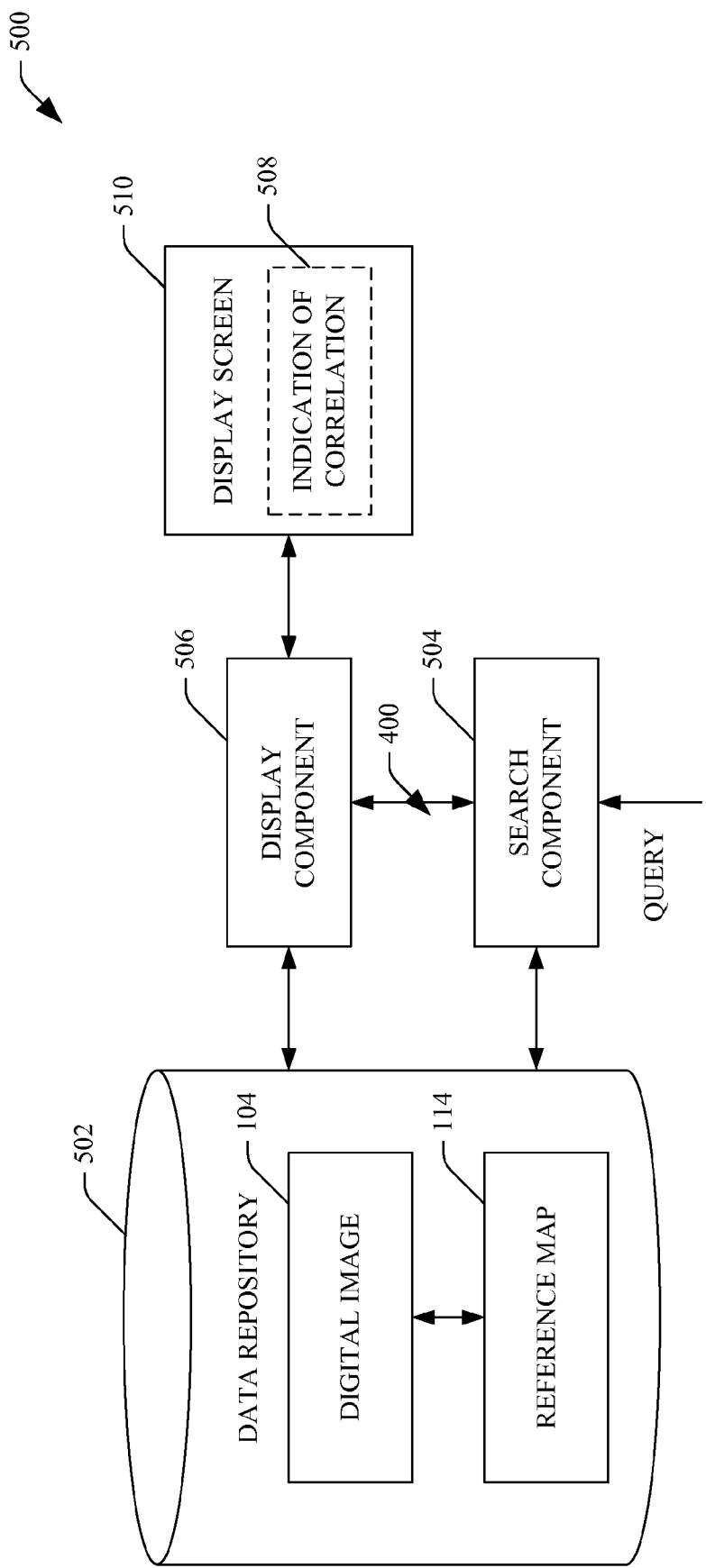
FIG. 5 is a functional block diagram of an example system that facilitates displaying an indication that a digital image is a map of a particular geographic region.

Referring now to FIG. 5, an example system 500 that facilitates displaying an indication that the digital image 104 corresponds to at least a portion of the reference map 114 is illustrated. The system 500 includes a data repository 502, wherein the data repository 502 may include the digital image 104, the reference map 114, and correlation data that correlates the digital image 104 with at least a portion of the reference map 114. For instance, the digital image 104 may be a map of a particular geographic region and the reference map 114 may include such geographic region. A detailed example of the reference map 114 may be a map of the world and the digital image 104 may have been found to be a tax map pertaining to a particular city in the world. Thus, the digital image 104 can be correlated to a portion of the reference map 114 pertaining to the city.

The system 500 further includes a search component 504 that receives a search query from a user pertaining to a geographic location. For instance, the query may be a textual query such as a street address, a name of a city, a name of a landmark, etc. In another example, the reference map 114 may be displayed to a user interactively such that the user can search over portions of the reference map 114 by using a pointing and clicking mechanism such as a mouse. Therefore, the query may be in the form of a series of clicks, one or more scrolls, etc. Furthermore, the query can be a query that is audibly transmitted by a user to the search component 504.

The search component 504 can execute the search against the reference map 114 and can ascertain that a geographic region pertaining to the query issued by the user corresponds to the digital image 104. In an example, the query may be for a city in a particular state. The search component 504 can search contents of the data repository 502 and can locate such city in the reference map 114. Additionally, the search component 504 can determine that the digital image 104 is also a map pertaining to the city searched for by the user.

The system 500 may further include a display component 506, wherein the display component 506 can cause an indication of correlation 508 between the portion of the reference map 114 searched for by the user and the digital image 104 to be displayed on a display screen 510. For instance, the indication of correlation 508 may be a substantially simultaneous display of a portion of the reference map 114 pertaining to the user query and the digital image 104. In another example, the indication of correlation 508 may be a portion of the reference map 114 pertaining to the query and a selectable link, wherein selection of such link causes the digital image 104 to be presented to the user on the display screen 510. Furthermore, while the indication of correlation 508 is shown as being presented on a display screen 510, it is to be understood that the indication of correlation 508 may be audible or any other suitable indication.

Additionally, it can be understood that a portion of the reference map 114 may be correlated with a plurality of digital images that are maps of the geographic region pertaining to the portion of the reference map 114. In an example, the query received by the search component 504 may be a query for a particular city. The city in the reference map 114 may be correlated to tax maps, maps of gas lines, layouts of certain buildings, a map of bike trails in the city, etc. The search component 504 can provide the display component 506 with information indicating that the portion of the reference map 114 is correlated with these images (maps) and the display component 506 can cause the display screen 510 to display indications of correlations for each digital image that is correlated with the portion of the reference map 114. Therefore, maps of geographic regions can be aggregated such that various different types of maps of one or more geographic regions can be quickly located and analyzed by a user.

In an example, many thematic maps (such as a map of hiking trails, a map of gas pipes, or other maps with general location data (cities, roads, rivers, etc.) may include data that enables easier recognition. When comparing several maps of the same area, the determiner component 106 can ascertain what are the general data of that area by analyzing data (points of interest) that are repeated at many maps. If, on the other hand, a unique entity is located that appears in a single map of an area, such data can be used by the display component 506 in connection with displaying thematic layers (e.g., "The gas lines", "the hike paths", . . . ). The thematic layers can be selectively turned on and off while maintaining underlying general information.

Figure 6:
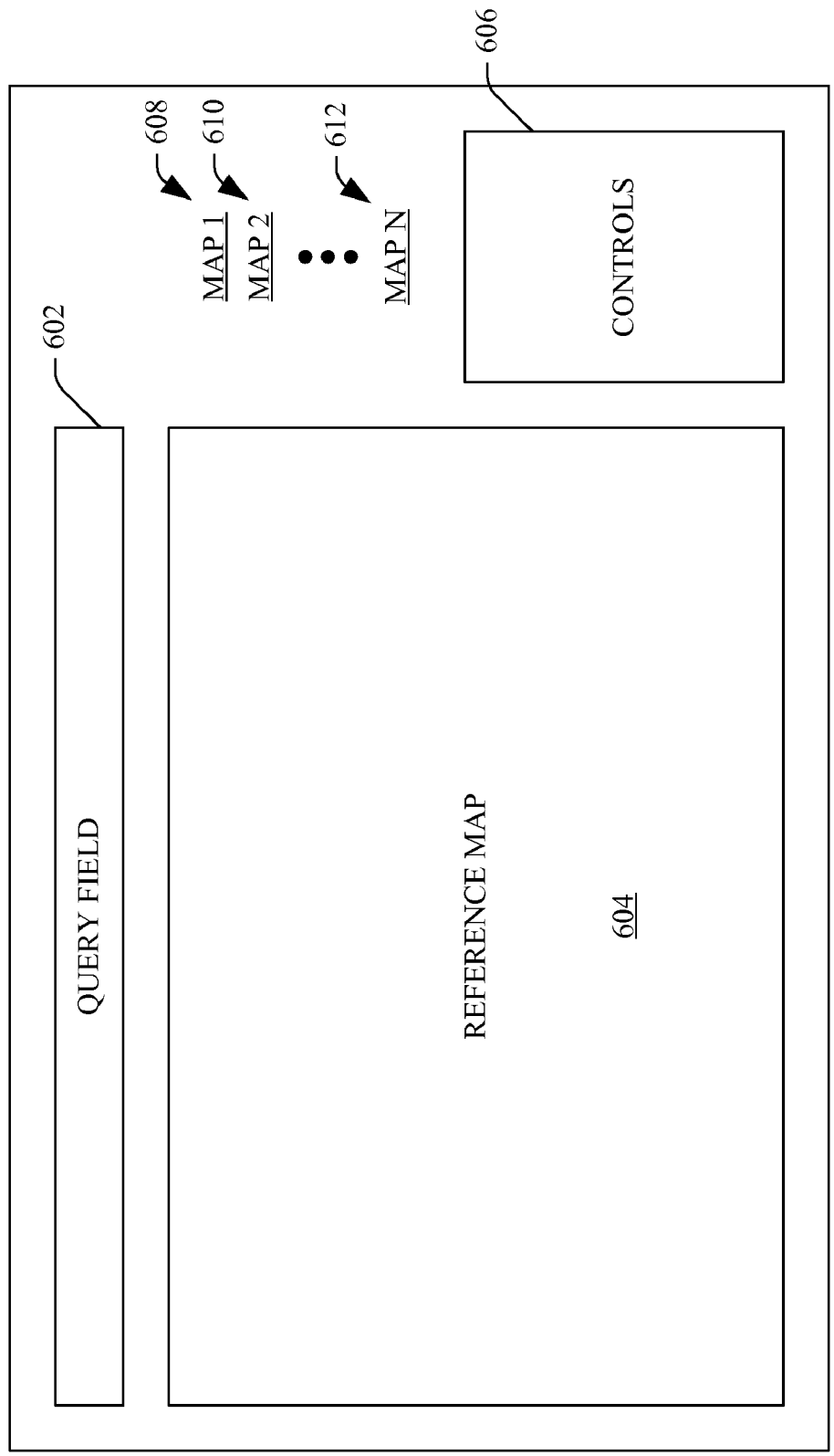
FIG. 6 illustrates an example graphical user interface that displays a portion of a reference map pertaining to a geographic region and indications that other maps pertain to the geographic region.

Now referring to FIG. 6, an example graphical user interface 600 that can be displayed to a user by the display component 506 (FIG. 5) is illustrated. The graphical user interface 600 includes a query field 602 that can be employed in connection with receiving a textual query from a user pertaining to a geographic location and/or landmark. For instance, the user may type a name of a city, state, county, province, a street address, a latitude/longitude combination, or other data into the query field 602. Upon a query submitted by way of the query field 602 being processed, at least a portion of a reference map 604 can be depicted to the user. For instance, the reference map 604 may be a street map pertaining to the query issued by the user, an aerial map of a geographic region pertaining to the query issued by the user, a three-dimensional model of the geographic region pertaining to the query issued by the user, etc.

The graphical user interface 600 may further depict one or more selectable controls 606 that can cause different data to be displayed in the reference map 604. For instance, the controls 606 may include selectable buttons, sliders, etc. In a detailed example, the controls may relate to providing location information pertaining to restaurants, malls and shopping centers, movie theaters, etc. Therefore, for instance, if a control pertaining to restaurants is selected, information pertaining to location of restaurants can be presented in the portion of the reference map 604 displayed to the user.

The graphical user interface 600 may further include a plurality of selectable links 608-612. The links 608-612 can pertain to digital images that have been found to be maps corresponding to the geographic region depicted through use of the reference map 604. For instance, selection of one of the links 608 through 612 can cause a digital image (map) corresponding to the link to be presented to the user. The selectable links can be ordered based at least in part upon probability that images corresponding to the links are maps of the geographic region depicted by way of the reference map 604 in the graphical user interface 600. In another example, the links 608-612 can be presented in an order based upon the perceived relevance of such maps to the user or the general population. It is to be understood that links displayed to the user can change as the reference map 604 is traversed. For instance, if a user zooms further in using the reference map 604, links provided to the user can alter and/or order of such links presented to the user can be changed.

Figure 7:
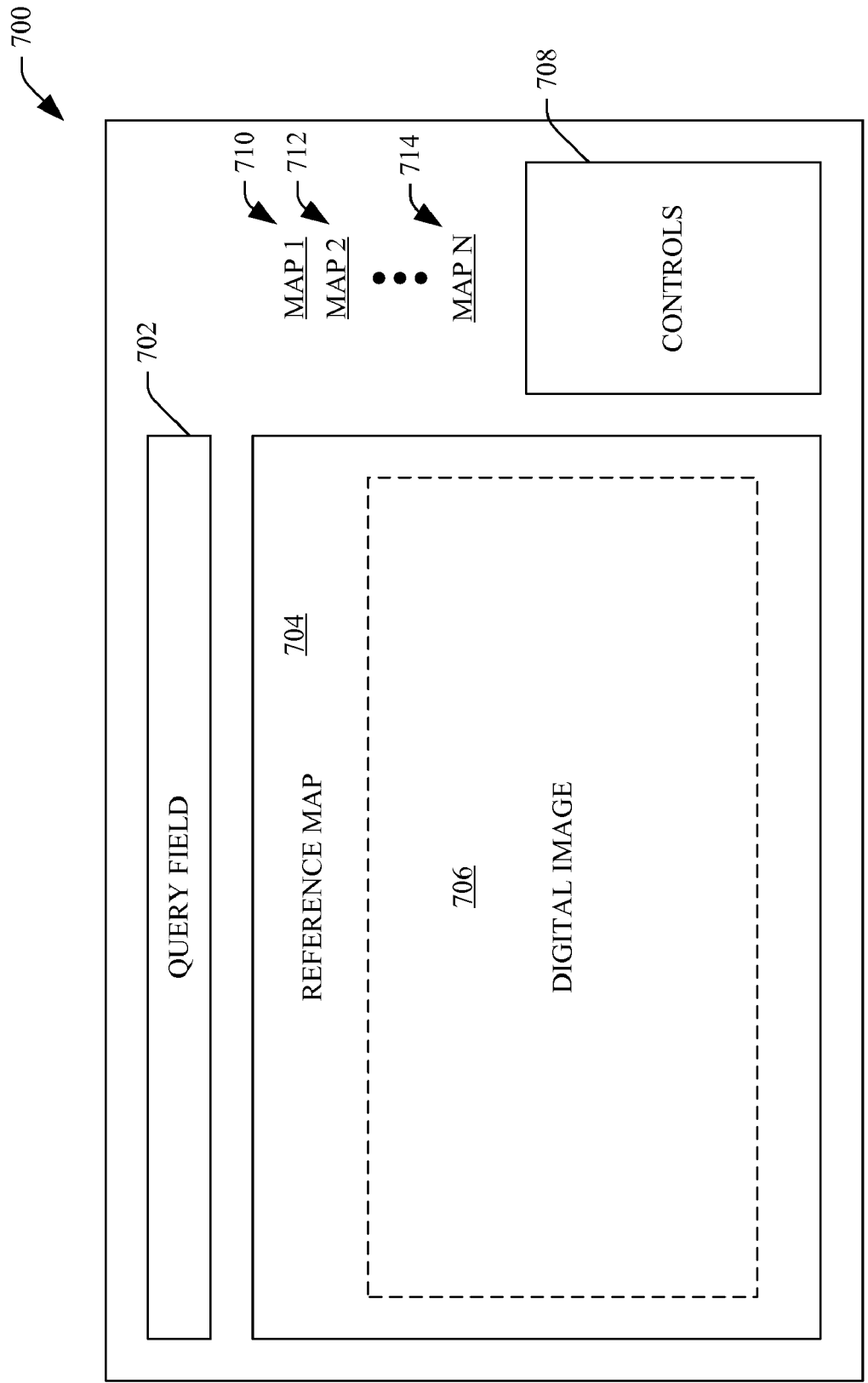
FIG. 7 illustrates an example graphical user interface that displays a reference map pertaining to a geographic region and simultaneously displays a digital image that is also a map of the geographic region.

Turning now to FIG. 7, an example graphical user interface 700 that can be displayed to a user is illustrated. The graphical user interface 700 includes a query field 702, where a user can enter a query pertaining to a geographic location (e.g., name of a street, street address, city, landmark). Upon processing queries provided by the user, the graphical user interface 700 can display at least a portion of a reference map 704 that pertains to the input query. Furthermore, upon processing the query and/or upon receipt of other suitable inputs from a user, the graphical user interface 700 can display a digital image 706 that also pertains to the query provided by the user. For instance, the digital image 706 can be displayed in a semi-transparent manner such that contents of the digital image 706 are laid on top of contents of the reference map 704 displayed to the user. In an example, the reference map 704 may be a street map and the digital image 706 may be a map of gas lines. Accordingly, a user can quickly ascertain where gas lines exist with respect to one or more streets.

The graphical user interface 700 can additionally depict one or more controls 708 to the user, wherein the controls may operate in a manner substantially similar to the controls 606 (FIG. 6) described above. In addition, the controls 708 may include controls for selectively visually presenting or visually removing one or more digital images that are found to be maps of the geographic region pertaining to the query issued by the user. Furthermore, the controls 708 may include controls for changing how digital images are presented with respect to the reference map 704.

The graphical user interface 700 can further include a plurality of selectable links 710-714 which are similar to the selectable links described above with respect to FIG. 6. Selection of one or more of the selectable links can cause a corresponding digital image/map to be presented to the user together with the reference map 704, for example. In another example, selection of one or more of the links 710-714 can cause one or more digital images/maps to be presented in a different browser window.

Figure 8:
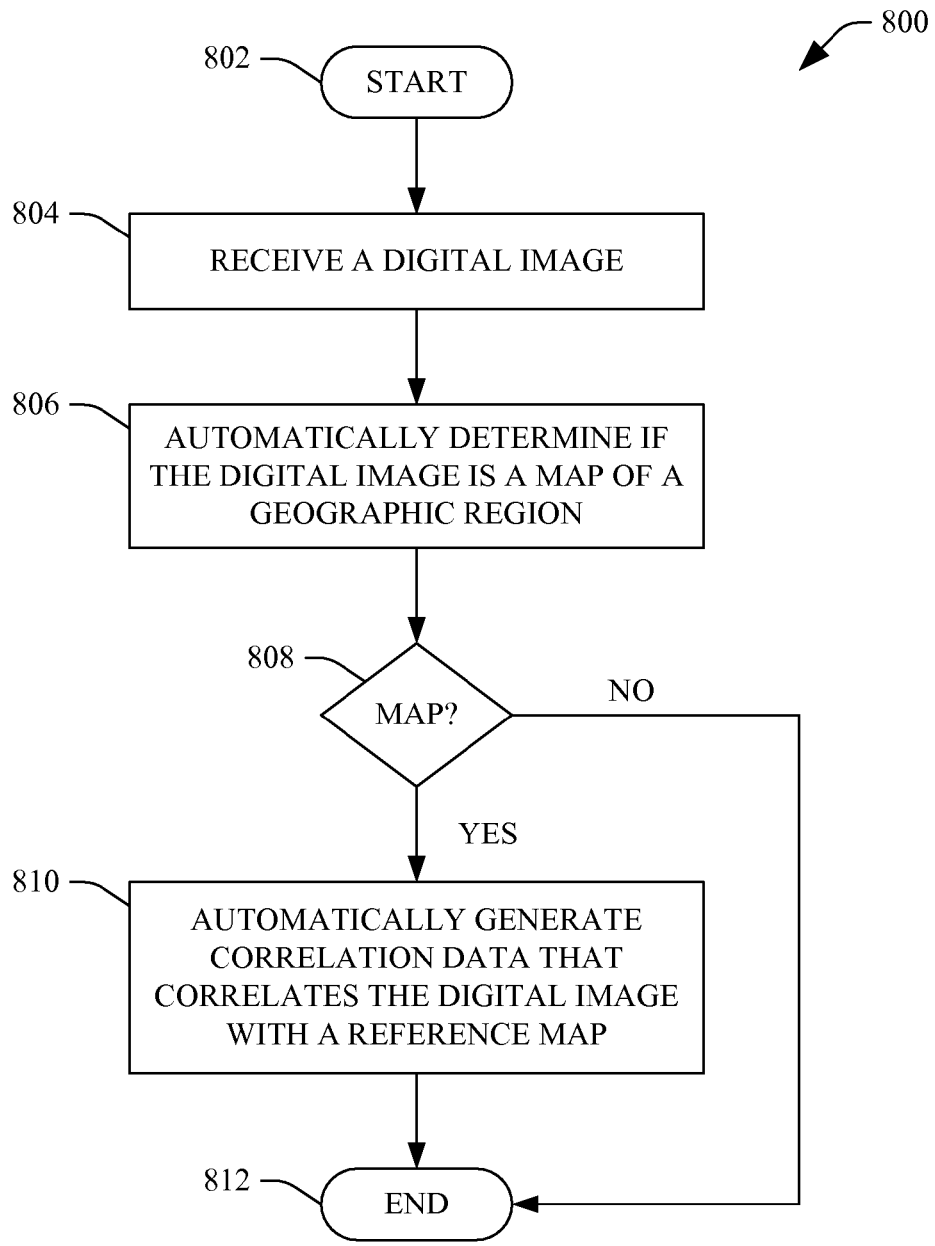
FIG. 8 is a flow diagram that illustrates an example methodology for determining that a digital image is a map of a geographic region.
Figure 9:
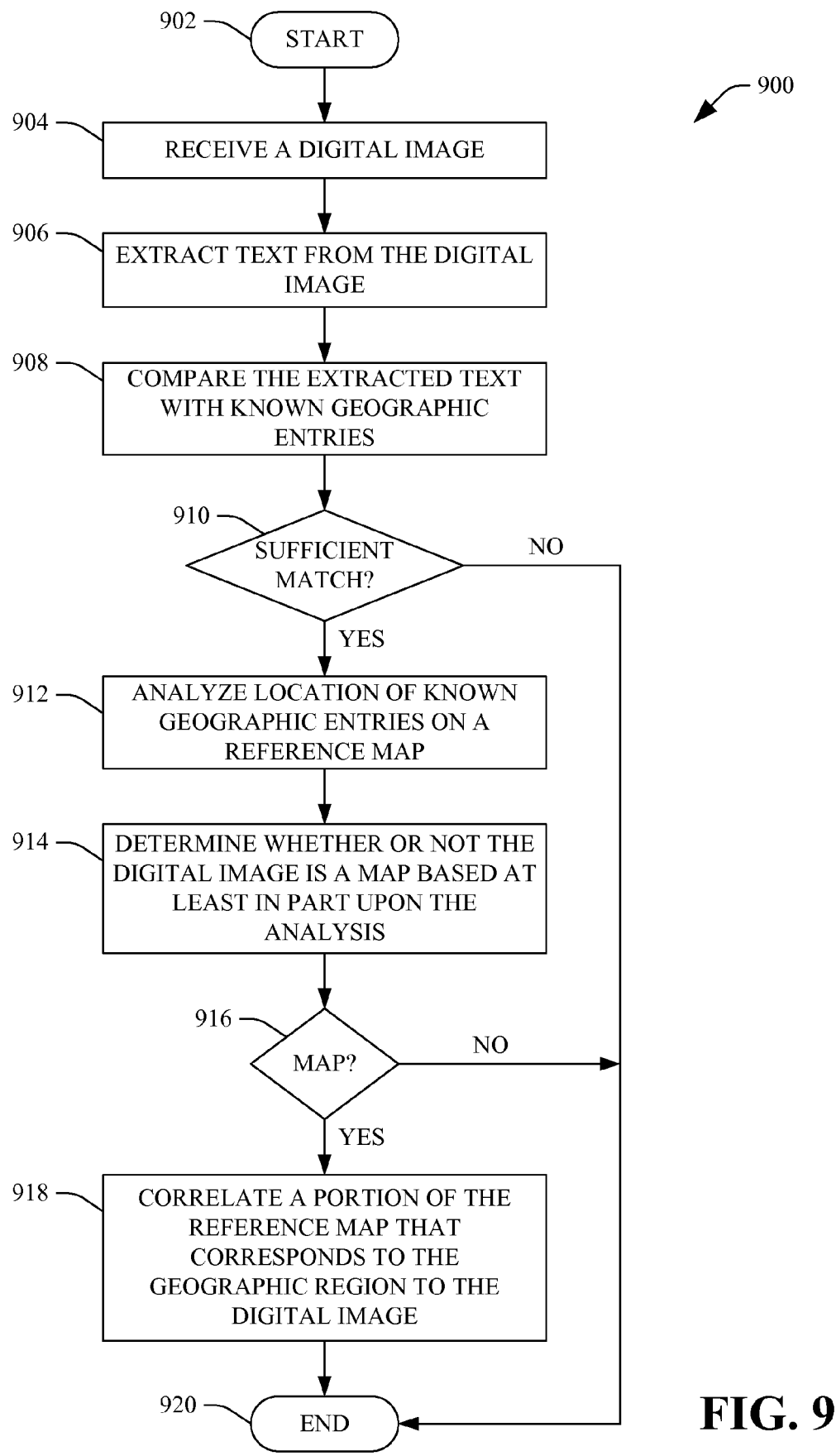
FIG. 9 is a flow diagram that illustrates an example methodology for determining whether or not a digital image is a map of a geographic region.

With reference now to FIGS. 8-9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, an example methodology 800 that facilitates determining whether or not a digital image is a map of a geographic region is illustrated. The methodology 800 begins at 802, and at 804 a digital image is received. For instance, the digital image may be located through use of a web crawler.

At 806, an automatic determination is made regarding whether or not the digital image is a map of a particular geographic region. For example, in connection with determining if the digital image is a map of a geographic region, text can be extracted from the digital image and compared with a database of known points of interest/landmarks. If a sufficient match exists between text extracted from a digital image and known points of interest that are geospatially related, then it can be ascertained that the digital image is a map of the geographic region.

Furthermore, determining whether the digital image is a map of a geographic region can include determining if matches between text extracted from a digital image and points of interest in the database of known points of interest have some sort of spatial correspondence. Such determination can be made, for instance, through use of a reference map with a Voronoi diagram drawn thereon, such that the digital image can be back-projected onto the reference map. In another example, determining whether or not the digital image is a map of a geographic region can include determining if locations in a digital image corresponding to the extracted text fall within a threshold radius of error of corresponding points of interest in the reference map. Still further, determining whether or not the digital image is a map of a geographic region can include performing some modification on the digital image such as changing coordinate systems of a digital image, altering orientation of a digital image, etc.

At decision block 808, if it is ascertained that the digital image is a map of a geographic region, the methodology 800 proceeds to act 810, where correlation data can be automatically generated that correlates the digital image with a portion of a reference map that pertains to the geographic region. As indicated above, correlation data may be or include formatting data that causes the portion of the reference map and the digital image to be correlated in a table, one or more pointers that cause a portion of the reference map to be linked to the digital image, and/or other correlation data. Furthermore, it is to be understood that acts 806, 808 and 810 can be repeated for a plurality of digital images, such that an aggregation of maps of geographic regions can be undertaken. Furthermore, once it is determined that the digital image is a map of a geographic region, such digital image can be more closely aligned with the reference map. For instance, linear features in the digital image can be aligned with corresponding linear features in the reference map such that the reference map and the digital image have a substantially similar coordinate system and/or orientation. If the digital image is not a map of a geographic region, the methodology completes at 812.

With reference now to FIG. 9, an example methodology 900 for correlating a digital image to at least a portion of a reference map, is illustrated. The methodology 900 starts at 902, and a 904 a digital image is received.

At 908, text is extracted from the digital image using any suitable text extraction technique. At 908, the extracted text can be compared with known points of interest wherein a point of interest can be a landmark, a street name, a city name, a state name, a restaurant, etc.

At 910 a determination is made regarding whether there is a sufficient match between text extracted from the digital image and the known points of interest. If there is not a sufficient match the methodology ends.

If at 910, it is determined that a sufficient match exists between the extracted text and the known points of interest, at 912 locations of known points of interest are analyzed on a reference map. For instance, this analysis may include drawing a Voronoi diagram on the reference map with respect to known points of interest that match the text extracted from the digital image. In another example, this analysis may include defining a radius of error around known points of interest in the reference map that correspond to extracted text found to have matched the known points of interest.

At 914, a determination is made regarding whether or not the received digital image is a map based at least in part upon the analysis undertaken in act 912. For instance, such determination can be made based upon results of back-projecting the location of the extracted text in the digital image onto the corresponding known points of interest in the reference map.

At decision block 916, if it is found that the digital image is not a map of a geographic region, the methodology ends.

If the digital image is found to be a map of a geographic region, then at 918 a portion of the reference map that corresponds to a geographic region can be correlated to the digital image. The methodology 900 then completes at 920.

Figure 10:
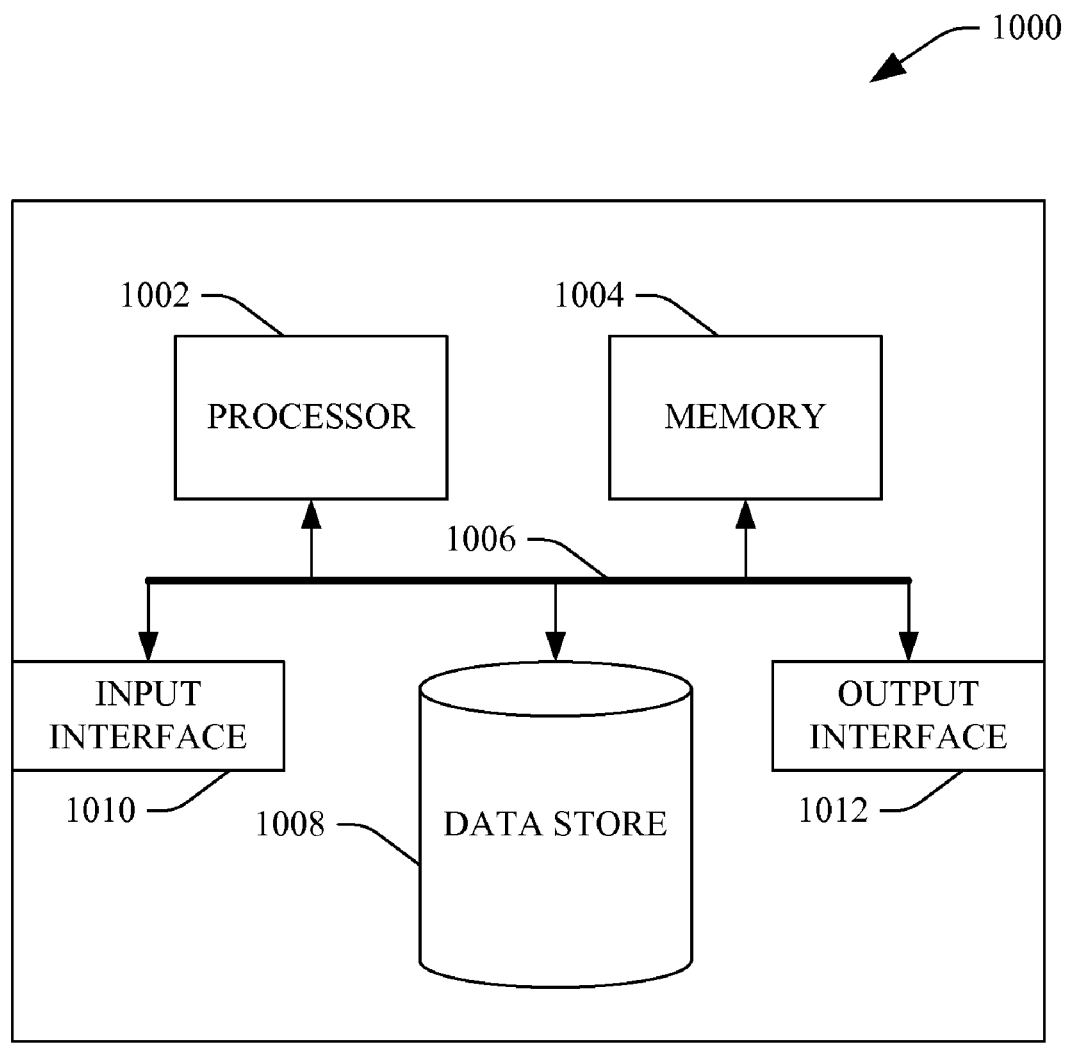
FIG. 10 is an example computing system.

Now referring to FIG. 10, a high-level illustration of an example computing device 1000 that can be used in accordance with the systems and methodologies disclosed herein is illustrated. For instance, the computing device 1000 may be used in a system that supports presentation of maps to users. In another example, at least a portion of the computing device 1000 may be used in a system that supports aggregating a plurality of maps pertaining to different geographic regions. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store digital images, at least a portion of a reference map, etc.

The computing device 1000 additionally includes a data store 1008 that is accessible by the processor 1002 by way of the system bus 1006. The data store 1008 may include executable instructions, map images, correlation data, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   automatically locating a digital image, the digital image being a candidate map of a geographic region;
   automatically determining whether or not the digital image is a map of a geographic region, wherein automatically determining whether or not the digital image is a map of the geographic region comprises:
   extracting text from the digital image;
   comparing the extracted text with a database of known points of interest for the geographic region to locate matches between the extracted text and the known points of interest for the geographic region; and
   determining whether or not there is spatial correspondence between the extracted text in the digital image and matched known points of interest, wherein the digital image is determined to be a map of the geographic region if and only if there is spatial correspondence between the extracted text in the digital image and the matched known points of interest; and
   if the digital image is determined to be a map of the geographic region, automatically generating correlation data that correlates the digital image with a reference map that includes the geographic region.

2. The method of claim 1, wherein automatically generating correlation data that correlates the digital image with a reference map that includes the geographic region comprises correlating matches between the extracted text and entries in the database of known points of interest.

3. The method of claim 2, wherein determining if matches between the extracted text and entries in the database of known points of interest have a spatial correspondence comprises back-projecting the digital image onto the reference map.

4. The method of claim 1, further comprising:
   receiving a plurality of digital images from a web crawler; and
   performing the automatically determining and the automatically generating for each of the plurality of images.

5. The method of claim 1, further comprising:
   receiving a user query for a map of the geographic region;
   displaying on a computer screen the reference map of the geographic region and an indication that the digital image is also a map of the geographic region.

6. The method of claim 5, wherein the indication is a link that, upon selection, causes the digital image to be displayed on the computer screen.

7. The method of claim 6, wherein at least a portion of the digital image is displayed concurrently with the reference map.

8. The method of claim 7, wherein the at least the portion of the digital image overlays at least a portion of the reference map.

9. The method of claim 5, wherein the indication is a concurrent display of the digital image with the reference map.

10. The method of claim 1, further comprising:
modifying the digital image such that a coordinate system of the digital image and a coordinate system of the reference map correspond.

11. The method of claim 1, wherein determining whether or not there is spatial correspondence between the extracted text in the digital image and matched known points of interest comprises determining whether the matched known points of interest located in the digital image translate to corresponding points of interest in the reference map within a threshold radius of error.

12. The method of claim 1, wherein determining whether or not there is spatial correspondence between the extracted text in the digital image and matched known points of interest comprises:
constructing a Voronoi diagram on the reference map based at least in part upon the matched known points of interest in the reference map, the Voronoi diagram comprising a plurality of cells;
back-projecting the digital image onto the reference map; and
determining whether the matched points of interest on the digital image lie within corresponding cells of the Voronoi diagram on the reference map.

13. A system comprising the following computer-executable components:
a text extractor component that extracts text from a digital image;
a determiner component that automatically determines whether or not the digital image is a map of a geographic region, wherein the determiner component determines whether or not the digital image is a map of a geographic region by comparing the text extracted from the digital image with entries in a database of known points of interest in the geographic region to identify matches, and subsequently determining whether the matched text extracted from the digital image has a spatial correspondence with the known points of interest on a reference map; and
a correlator component that generates correlation data that causes the digital image to be correlated with a portion of the reference map that pertains to the geographic region if the determiner component determines that the digital image is a map of the geographic region;
wherein the text extractor component, the determiner component, and the correlator component are implemented on one or more processors.

14. The system of claim 13, further comprising a display component that displays an indication on a computer display screen that the digital image is a map of the geographic region.

15. The system of claim 14, wherein the display component displays the indication on the computer screen upon receipt of a query from a user pertaining to viewing a map of the geographic region.

16. The system of claim 15, wherein the display component causes at least a portion of the digital image to be displayed concurrently with at least a portion of the reference map.

17. The system of claim 13, wherein the indication is a link to the digital image.

18. The system of claim 1, further comprising an image locator component that crawls the World Wide Web to locate the digital image.

19. A computer-readable storage device comprising instructions that, when executed by a processor, cause the processor to perform acts comprising:
receiving a digital image;
extracting text from the digital image;
comparing the extracted text with a database of known points of interest;
if a sufficient match exists between the extracted text and contents of the database of known points of interest, analyzing a spatial correspondence between the extracted text and entries in the database of known points of interest;
determining whether or not the digital image is a map of a geographic region based at least in part upon the analyzing of the spatial correspondence between the extracted text and the entries in the database of known points of interest; and
if the digital image is a map of the geographic region, correlating a portion of the reference map that corresponds to the geographic region with the digital image.

20. The system of claim 13, wherein the determiner component comprises a spatial comparer component that constructs a Voronoi diagram on the reference map based upon locations of the known points of interest on the reference map and back-projects the image onto the Voronoi diagram, wherein the Voronoi diagram comprises a plurality of cells, and wherein the determiner component determines whether or not the digital image is a map of the geographic region based upon spatial correspondence between the known points of interest on the digital image and respective cells of the Voronoi diagram.

* * * * *